United States Patent Office 3,504,894
Patented Apr. 7, 1970

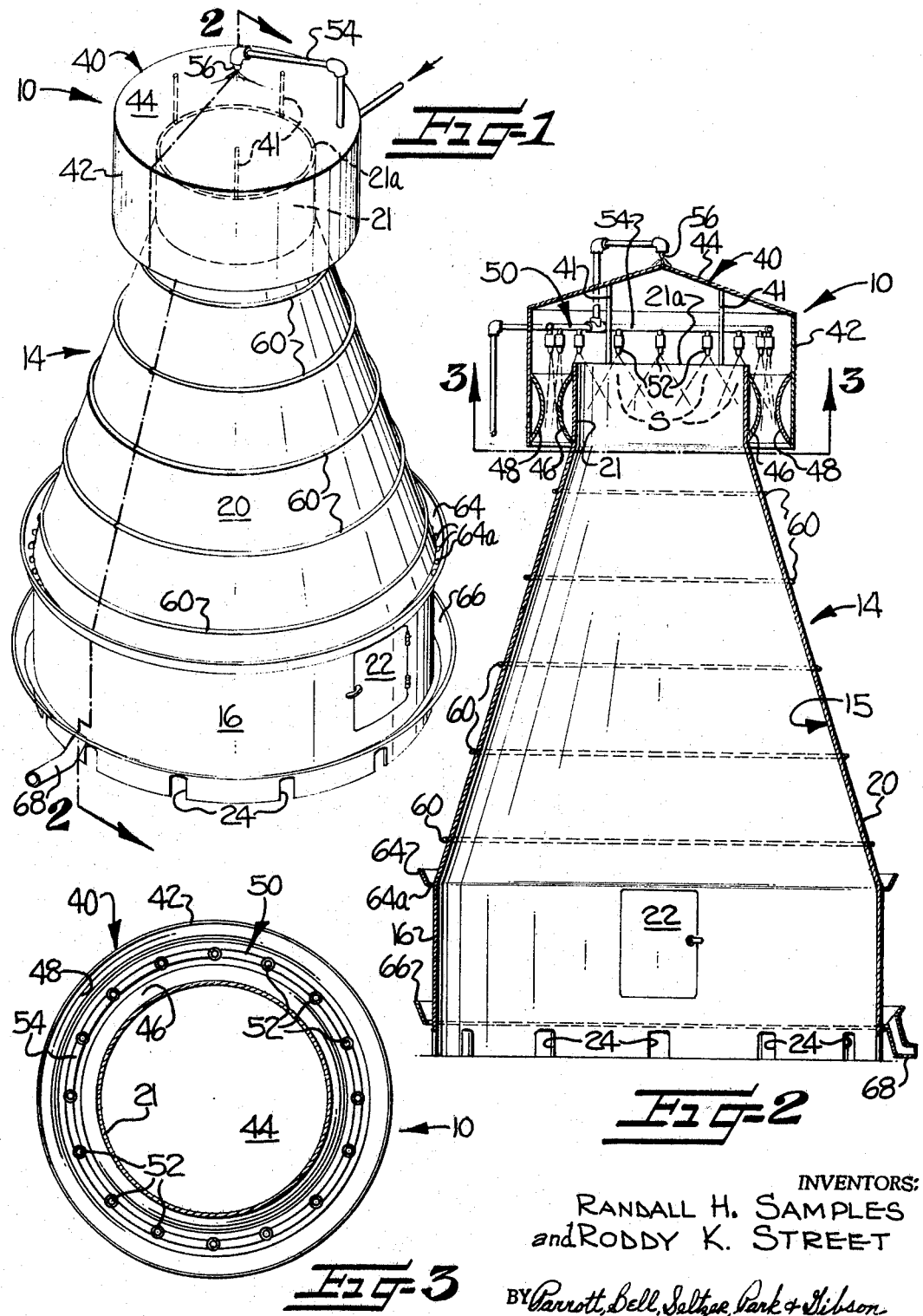

3,504,894
APPARATUS FOR PURIFYING AND ACCELERATING THE FLOW OF EFFLUENT GASES IN A GASEOUS FLOW STREAM
Randall H. Samples and Roddy K. Street, Mount Airy, N.C., assignors to Commercial Fabrication and Machine Company, Inc., Mount Airy, N.C., a corporation of North Carolina
Filed Feb. 21, 1968, Ser. No. 707,276
Int. Cl. F23g 5/00; B01d 47/10
U.S. Cl. 261—116    10 Claims

ABSTRACT OF THE DISCLOSURE

Apparatus such as an incinerator having means for removing contaminants from effluent gases released by processes such as burning of materials within the incinerator while accelerating their flow in the stream, comprising conduit means having first and second portions defining a gaseous flow path, the second portion being located downstream of the first portion and having a reduced cross-sectional area with respect thereto defining a restriction in the gaseous flow path, and means for dispensing a pressurized liquid spray into the flow path along and through the second portion of the conduit means in intimate contact with the flow of gases therein to remove contaminants from the gases and accelerate their flow through the conduit means.

The apparatus includes housing means having a generally frusto-conical outer wall converging upwardly, with the upwardly converging outer wall cooperating with the conduit means and the liquid spray dispensing means for passage of liquid from the second portion of the conduit means downwardly over the exterior of the upwardly converging outer wall of the housing means for cooling the same.

---

This invention relates to apparatus for removing contaminants from effluent gases in a gaseous flow stream while accelerating their flow, and further to an improved incinerator for combustible materials having means for removing undesirable solid contaminants from the gaseous by-products of combustion passing therefrom and for accelerating the flow of oxidizable gases through the incinerator to improve combustion of waste materials therein.

Pollution of the atmosphere by contaminating gases is a major concern of the public today. Countless industrial processes produce gaseous by-products which, if not purified or in some way controlled, contribute greatly to air pollution. It is also a common practice for municipalities and individuals to dispose of waste materials, such as garbage and other refuse, by burning in various incinerator apparatus designed for that purpose. The burning of such waste materials is also a major contributing factor to air pollution, since the gases emitted by the combustion of waste materials contain large amounts of solid particles, such as fly ash, soot, and other partially oxidized by-products which contaminate the atmosphere.

Various methods and equipment have been proposed to reduce air pollution by gaseous by-products of combustion, such as the use of after-burners and/or relatively complex mechanical filtration apparatus which serve, respectively, to further oxidize undesirable impurities entrained in the effluent gases and to mechanically remove solid particles from the gases emitted from the combustion apparatus. Although the employment of such equipment reduces pollution of the atmosphere by contaminated combustion gases, its installation, operation, and maintenance generally involves considerable expense, thus making it particularly impractical to employ in the smaller incinerator apparatus. Additionally, the installation of various mechanical purification equipment, such as filter screens, in a gaseous effluent flow path considerably restricts the flow of the gases and quite often necessitates the use of blower fans and the like to remove the gases and insure sufficient air flow for proper combustion of materials being burned.

It is therefore an object of the present invention to provide apparatus for removing contaminants from effluent gases in a gaseous flow stream while accelerating their flow which may be easily and economically installed and employed in various gaseous flow systems, and which overcomes, to a great extent, the problems heretofore encountered.

It is another object of the present invention to provide an improved incinerator for combustible materials having means for removing contaminants from the gaseous effluent therefrom and for improving the effective combustion of the waste materials in the incinerator.

It is a more specific object of this invention to provide an improved incinerator of the type described which employs liquid dispensing means in the gaseous effluent flow conduit thereof to purify the gases and accelerate their flow through the incinerator.

It is a further object of this invention to provide an improved incinerator of the type described wherein liquid from the liquid dispensing means is further used to cool the incinerator during combustion.

Some of the objects of the invention having been stated, other objects will appear as the description proceeds, when taken in connection with the accompanying drawings, in which—

FIGURE 1 is an isometric view of an improved incinerator incorporating the novel features of the present invention;

FIGURE 2 is a vertical sectional view of the incinerator taken generally along line 2—2 FIGURE 1 and looking in the direction of the arrows therein; and FIGURE 3 is a horizontal sectional view of the incinerator taken generally along line 3—3 of FIGURE 2 and looking in the direction of the arrows therein.

Referring more specifically to the drawings, FIGURE 1 shows an apparatus of the present invention for removing contaminants from effluent gases in a gaseous flow stream while accelerating the flow of the gases in the stream, which apparatus comprises conduit means, generally indicated at 10, defining a gaseous flow path for effluent gases. As illustrated, the conduit means 10 is attached to and forms a part of an improved incinerator 14 of the present invention which is composed of suitable fire-resistant material, such as sheet metal, and the like, and includes a combustion chamber 15 (FIGURE 2). The lower portion of the combustion chamber 15 includes a generally vertical cylindrical wall 16, and the upper portion includes a frusto-conical wall 20 which is attached to the cylindrical wall 16 and converges upwardly therefrom and an upper, short vertical cylindrical wall 21 having an outlet opening 21a therein. Although the bottom of the incinerator is shown to be open and the incinerator is adapted to be placed on a suitable fire-resistant base, such as concrete or earth, a bottom wall may be provided, if desired.

Located in the cylindrical wall 16 of the lower portion of the combustion chamber is an access door 22 to permit the insertion of various waste materials to be burned in the incinerator. Also located in the lower portion of the chamber are gas inlet means which consist of openings 24 arcuately spaced about the lower periphery of the cylindrical wall 16 to permit the entrance of a source of oxygen, such as air, into the combustion chamber during burning of the waste materials. Although not shown, a supporting member, or grate, may be positioned across the lower portion of the combustion chamber above the openings 24 to space the waste materials thereabove and facilitate the circulation of oxidizable gases through the materials during combustion.

The conduit means 10, as illustrated, communicates with outlet opening 21a in the upper portion of the combustion chamber 15 and defines a gaseous flow path for the removal of combustion gases containing solid byproducts of combustion from the combustion chamber. Conduit means 10 comprises a cap member 40 which is supportingly spaced from the combustion chamber 15 by bracket arms 41. The cap member overlies the outlet opening 21a and has a downwardly extending cylindrical wall 42 spaced outwardly from and in encircling relation to the short vertical cylindrical wall 21 forming the upper portion of the outer wall of the combustion chamber. The upper wall 44 of cap member 40 is of generally conical shape to facilitate the flow of cooling liquid thereover, as will be explained.

Secured to the opposing faces of the spaced walls 21 and 42 of the combustion chamber and cap member, respectively, are arcuately shaped rings 46, 48 (FIGURE 2) which are generally axially aligned with the annular passageway formed between the walls and are positioned in opposed relation to form a venturi-shaped constriction therebetween. The upper portion of the cap member 40 above the outlet opening 21a in the combustion chamber forms a first portion of the conduit means, and the lower portion of cylindrical wall 42 cooperates with cylindrical wall 21 to define a second portion located downstream of the gaseous flow path relative to the first portion and having a cross-sectional area which is reduced with respect to the cross-sectional area of the first portion of the conduit means. Rings 46, 48 cooperate to form venturi-shaped means in the second portion of the conduit means for a purpose which will be explained more fully hereinafter.

Located in the cap member 40 and positioned in the gaseous flow path are liquid dispensing means, generally indicated at 50, for directing a pressurized spray of liquid along and through the second portion of the conduit means in intimate contact with the flow of gases to remove contaminants from the effluent gases passing therethrough and to accelerate the flow of gases through the conduit means. The liquid dispensing means 50 comprises nozzle means, such as a plurality of nozzles 52, positioned adjacent the upstream end of the downwardly extending second portion of the conduit means 10 for directing a plurality of overlapping sprays S of liquid along and through the annular passageway defined by the walls 21, 42 and through the restriction in the gas flow path defined by the venturi-shaped rings 46, 48.

As seen in FIGURES 2 and 3, the nozzles 52 are arcuately spaced above and outside the upper wall 21 of the combustion chamber in surrounding relation to the outlet opening 21a, with their discharge openings generally aligned with the downwardly extending passageway between the walls 21, 42. Liquid, such as water, is supplied from a liquid supply source (not shown) by a piping arrangement 54 to each of the nozzles 52 and to a nozzle 56 centrally positioned above the conical upper wall 44 of the cap member 40.

The sprays S of liquid passing downwardly through the second portion of the conduit means intimately contact the concurrently moving combustion gases passing between the spaced walls 21, 42 and rings 46, 48 to scrub the gases of undesirable solid by-products of combustion which are entrained in the gases. In addition, the pressurized flow of the sprays through the restriction in the gas flow path defined by the venturi-shaped rings 46, 48 provides an ejection effect which acts to accelerate the flow of gases through the incinerator and draws more air into the gas inlet openings 24 in the lower portion of the combustion chamber for contact with the materials being burned, thereby facilitating their combustion.

Although the necessary restriction in the downwardly extending second portion of the conduit means is provided by the arcuately-shaped rings 46, 48 which extend about the entire circumference of the spaced walls, other means may be employed to provide the restriction in the flow path, such as a plurality of individual venturi-shaped nozzles positioned below and in alignment with each of the spray nozzles 52. If desired, the venturi shape could be eliminated, and the wall 42 of the cap member and the wall 21 of the combustion chamber could serve to provide the necessary reduction in the cross-sectional area of the flow path to create the ejection effect; however, it can be appreciated that use of a venturi shape reduces the friction acting on the flowing gases and thus facilitates their acceleration through the restriction.

The cap member is located such that the downwardly directed second portion of the conduit means terminates generally centrally of and above the frusto-conical upper wall 20 of the combustion chamber 15. This permits liquid passing from the downwardly directed spray nozzles 52 to contact and flow downwardly by gravity over the outer surface of the walls 20, 16 of the combustion chamber, thereby providing a cooling effect for the combustion chamber and preventing buckling or burning out of the walls of the incinerator.

To further facilitate cooling of the incinerator by the liquid, the outer surface of the upwardly converging frusto-conical wall is provided with a plurality of longitudinally spaced rings or baffles 60 which serve to retard and further distribute the flow of the cooling liquid passing downwardly over the walls of the incinerator.

As previously mentioned, the upper wall 44 of the cap member 40 is also provided with the liquid distributing nozzle 56 which serves to pass cooling liquid over the outer surface of the cap member 40 to cool the same and this liquid combines with the liquid from the spray nozzles 52 to flow over the walls of the combustion chamber.

Secured to the vertical lower wall 16 of the combustion chamber 15 are collection means for the cooling liquid which include a first outwardly extending ring-shaped collection plate 64 which is secured to and extends generally horizontally along the wall 16 at its point of connection to the wall 20. The plate 64 serves as a trough collect cooling liquid passing down the frusto-conical upper wall 20 of the chamber and has a plurality of spaced openings 64a in its lower edge (FIGURE 1) to distribute the liquid downwardly along the lower vertical wall of the chamber where it is received by a second horizontally disposed ring-shaped collection plate 66 secured to the lower portion of the wall 16 above the gas inlet openings 24. The collected liquid is removed therefrom by a conduit 68 and, although not shown, the purifying and cooling liquid may be cleaned of entrained contaminants by suitable means, such as a filtration system, and recirculated for use.

In operation, waste material to be burned is placed in the lower portion of the incinerator through the access door 22, the door closed, and the material ignited in a suitable manner. During combustion of the material, gaseous by-products pass upwardly through the combustion chamber and through the outlet opening 21a where they are directed downwardly by the cap member 40 and intimately contacted by the downwardly directed sprays S of water emanating from the nozzles 52. During intimate contact with the sprays of water, solid particles in the gases, such as soot, fly ash, cinders, and the like, are wetted and become entrained in the liquid for removal from the effluent gases. In addition, condensible effluent gases are cooled or solvated by the water spray for removal from the effluent gases.

The movement of the downwardly directed pressurized liquid through the venturi-shaped restriction in the second portion of the conduit means serves to accelerate the flow of gases passing through the second portion, and accordingly accelerate the flow of oxidizable gases passing into the inlet openings 24 in the lower portion of the incinerator and through the combustion chamber, thereby facilitating the combustion of waste products in the incinerator.

The contaminant-laden liquid passing from the confines of the cap member 40 and the cooling liquid flowing over the outer surface of the cap member fall onto the baffled outer surface of the frusto-conical wall of the upper portion of the combustion chamber, and the combined liquids thereafter flow by gravity down the walls of the incinerator to effectively cool the chamber and incinerator during combustion.

From the foregoing detailed description of the invention, it can be seen that the novel apparatus of the present invention which employs a pressurized liquid to both remove contaminants from and accelerate the flow of gases in a gaseous flow stream may be economically installed and employed in various gaseous flow systems wherein it is desired to purify and accelerate the flow of effluent gases passing therethrough, and it is particularly adapted for use in the improved incinerator of the present invention wherein the liquid provides an additional function of cooling the incinerator during combustion of the waste materials therein.

In the drawings and specification, there has been set forth a preferred embodiment of the invention, and although specific terms are employed, they are used in a generic and descriptive sense only and not for purposes of limitation.

That which is claimed is:

1. Apparatus having means for controlling emission of contaminants such as byproducts of combustion and comprising:
    housing means defining an enclosed hood for containing processes which release hot, contaminating, effluent gases such as burning of materials and having a generally frusto-conical outer wall converging upwardly,
    conduit means defining a gaseous flow path connecting the interior of said housing means and ambient atmosphere and having a first portion communicating with said hood for receiving hot effluent gases passing therefrom and a second portion generally concentric with and extending around said first portion and communicating therewith for receiving hot effluent gases therefrom and passing such gases to the ambient atmosphere, said conduit means having its least cross-sectional area at said second portion and said second portion overlying and opening downwardly above said upwardly converging outer wall of said housing means, and
    means for motivating the flow of effluent gases from said hood, for removing contaminants from the effluent gases and for cooling said upwardly converging outer wall comprising a spray system injecting a liquid spray into the gaseous flow path at and through said second portion in the direction effluent gases are to be drawn therethrough and directing liquid from said second portion downwardly over the exterior of said upwardly converging outer wall of said housing means for cooling the same.

2. Apparatus as defined in claim 1 wherein said conduit means terminates generally centrally of and above the upper portion of the combustion chamber to permit liquid from said liquid dispensing means to flow by gravity downwardly over the walls of the combustion chamber to cool the incinerator.

3. Apparatus as defined in claim 1 wherein said second portion of said conduit means includes venturi-shaped means positioned downstream of said spray system and at said least cross-sectional area of said conduit means.

4. Apparatus as defined in claim 1 wherein said hood has a gaseous outlet opening in its upper portion, and wherein said first and second portions of said conduit means includes a cap member overlying the outlet opening, said cap member having a downwardly extending wall spaced outwardly from and in encircling relation to an upper portion of the outer wall of said hood, and wherein said spray system includes a plurality of nozzles positioned in said cap member in surrounding relation to the outlet opening in said hood for directing a spray of liquid downwardly between the spaced walls of the cap member and hood concurrent to the direction of flow of gases passing through said conduit means for intimate contact therewith.

5. Apparatus as defined in claim 4 wherein the second portion of said conduit means further includes an arcuately shaped ring secured to each of the opposing faces of said spaced walls below said nozzles to define a venturi-shaped restriction between said spaced walls.

6. Apparatus as defined in claim 4 further including means for distributing liquid over the outer surface of the cap member to facilitate cooling thereof.

7. Apparatus as defined in claim 4 further including a plurality of liquid-directing baffles longitudinally spaced along the exterior surface of said upwardly converging outer wall of the hood to retard and further distribute the flow of liquid thereover and thereby facilitate cooling of the incinerator.

8. Apparatus as defined in claim 7 wherein said lower portion of the combustion chamber includes a generally vertical side wall and said gas inlet means comprises a plurality of openings spaced along the lower periphery of the side wall, and further including collection means cooperating with the vertical side wall of the combustion chamber above the spaced openings therein for receiving liquid passing over the outer surface of the walls of the incinerator, and means for removing liquid from said collection means.

9. Apparatus as defined in claim 8 wherein said collection means includes a first liquid collection plate extending generally horizontally along said vertical side wall adjacent its connection to said upwardly converging walls of the combustion chamber to collect liquid flowing downwardly over the upwardly converging walls and distribute it over said vertical side wall.

10. Apparatus as defined in claim 9 wherein said collection means further includes a second collection plate extending generally horizontally along said vertical side wall below said first plate and adjacent the arcuately spaced openings in the combustion chamber to receive liquid flowing down the vertical side wall of the chamber.

References Cited

UNITED STATES PATENTS

| | | | |
|---|---|---|---|
| 888,119 | 5/1908 | Richards | 261—116 |
| 969,868 | 9/1910 | Herreshoff. | |
| 1,948,348 | 2/1934 | Gerhold | 261—126 |
| 2,869,487 | 1/1959 | Sherman. | |
| 2,978,998 | 4/1961 | Frankland | 110—18 |
| 3,045,990 | 7/1962 | Keenan | 261—126 X |
| 3,113,168 | 12/1963 | Kinney. | |
| 3,317,197 | 5/1967 | Lohner et al. | |
| 3,325,975 | 6/1967 | Coverston | 261—116 X |
| 3,395,656 | 8/1968 | Ford et al. | 110—18 |
| 3,406,953 | 10/1968 | Moore. | |
| 3,420,508 | 1/1969 | Hurst et al. | 261—116 |

TIM R. MILES, Primary Examiner

U.S. Cl. X.R.

110—8, 18